Figure 1:
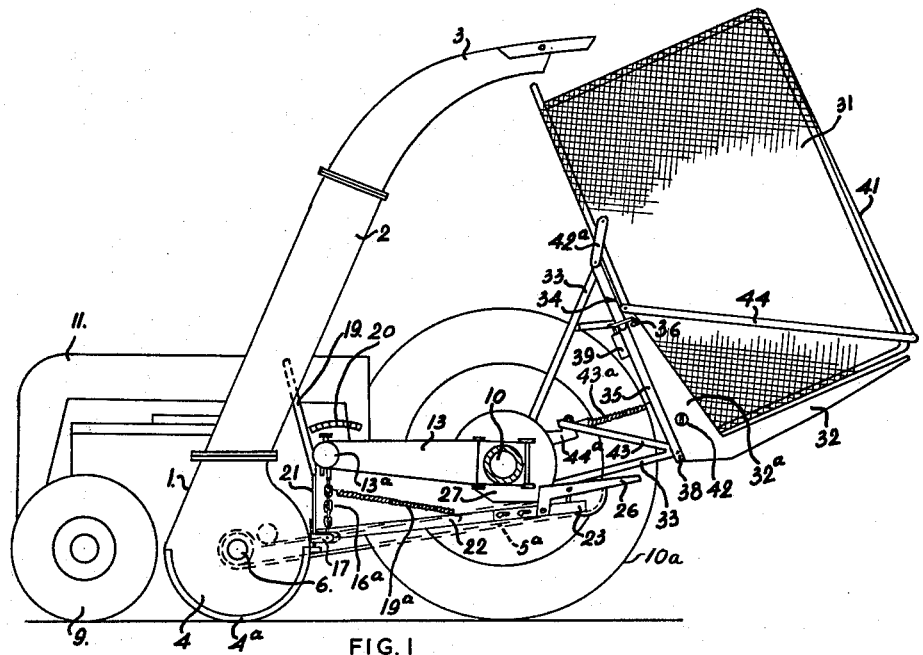

June 2, 1964  C. H. CHRISTIANSEN  3,135,080
FORAGE HARVESTING UNITS

Filed March 23, 1962  4 Sheets-Sheet 1

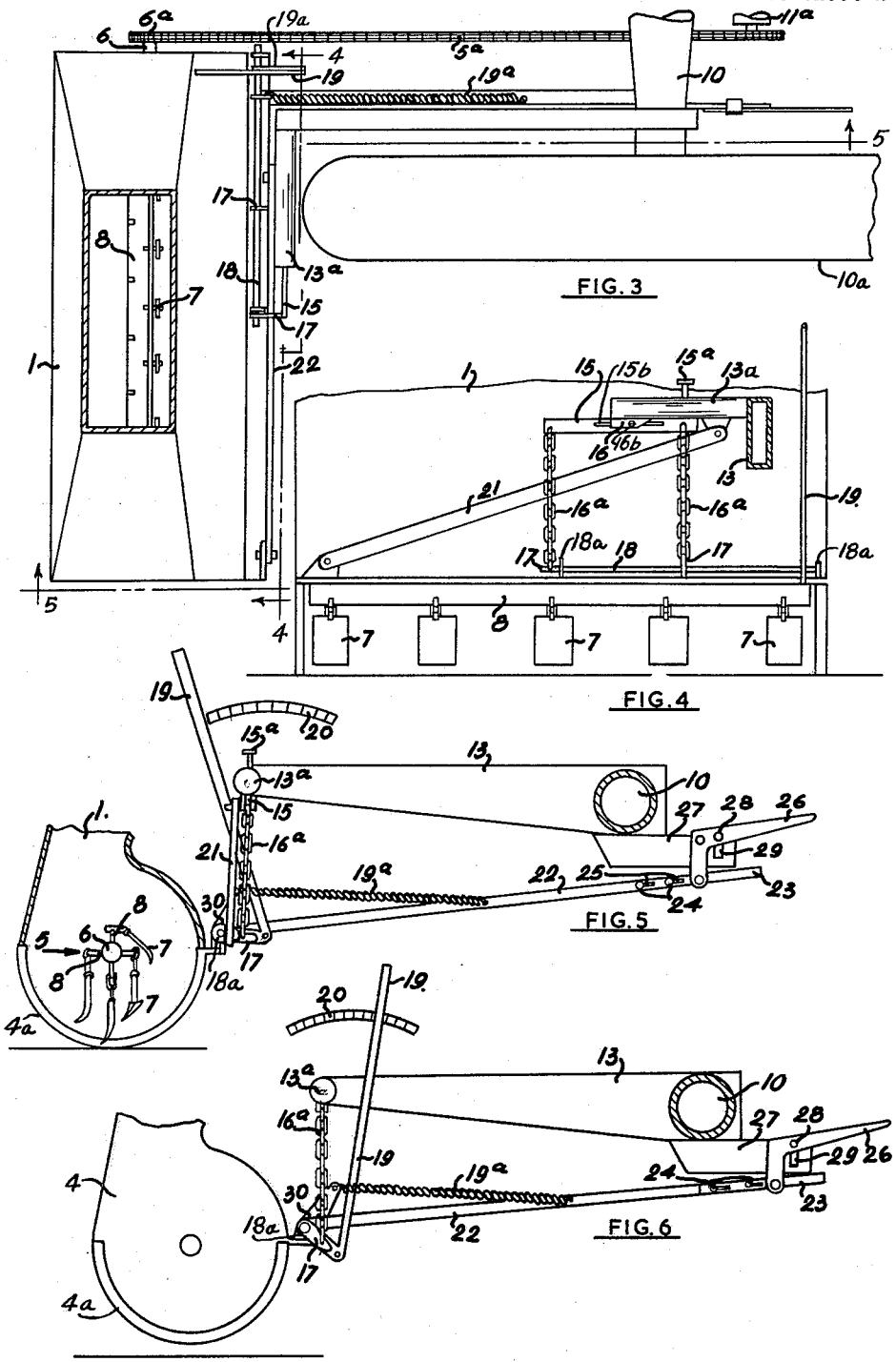

June 2, 1964 C. H. CHRISTIANSEN 3,135,080
FORAGE HARVESTING UNITS

Filed March 23, 1962 4 Sheets-Sheet 3

June 2, 1964 C. H. CHRISTIANSEN 3,135,080
FORAGE HARVESTING UNITS
Filed March 23, 1962 4 Sheets-Sheet 4

United States Patent Office 3,135,080
Patented June 2, 1964

3,135,080
FORAGE HARVESTING UNITS
Charles Herbert Christiansen, R.D. 3, Monavale,
Cambridge, Auckland, New Zealand
Filed Mar. 23, 1962, Ser. No. 181,962
10 Claims. (Cl. 56—24)

The invention relates to forage harvesting units used for the purpose of cutting and gathering grass, particularly for ensilage purposes.

One object of my invention is to provide an improved forage harvesting unit for use in conjunction with a tractor, the improved unit being powered from and operated from a tractor so that grass cut by the forage harvesting unit is delivered by the forage harvesting unit into a container or elsewhere. Of paramount importance however, the invention aims at providing a forage harvesting unit which can be mounted on, and operated from the side of a tractor, thus leaving the three point hydraulic linkage system of the tractor unoccupied for the accommodation of a container into which crop cut by the forage harvesting unit can be delivered.

It will be appreciated that by providing the improved forage harvesting unit mounted to the side of the tractor, the necessity of providing a separate trailer for the collection of cut crop is eliminated.

A further object of my invention is to provide an improved container adapted to be used in conjunction with the improved forage harvesting unit and which is accommodated on the three point hydraulic linkage system of the tractor in such a manner that material placed within the container can be quickly and easily dumped therefrom at selected points in stockpiles.

According to one aspect of the invention the improvements in or relating to forage harvesting units comprise a housing accommodating a rotary cutting means, a chute leading upwardly from the housing, an adjustable mounting means by means of which the housing, rotary cutting means and chute are adapted to be mounted on the side of a tractor in a manner facilitating adjustment of the rotary cutting means from ground level, and drive connection means adapted to drivably connect the rotary cutting means to the power take-off of the tractor.

According to a second aspect of the invention the improvements in or relating to forage harvesting units comprise a housing accommodating a rotary cutting means, a chute leading upwardly from the housing, an adjustable mounting means by means of which the housing, rotary cutting means and chute are adapted to be mounted on the side of a tractor in a manner facilitating adjustment of the rotary cutting means, drive connection means by means of which the rotary cutting means is adapted to be connected to the power take-off of the tractor, and a container into which crop cut by the rotary cutting means is deposited, the said container being constructed with a hinged wall and being mounted on the hydraulic linkage system of the tractor, and control means controlling opening of the wall for emptying purposes.

Figure 2:
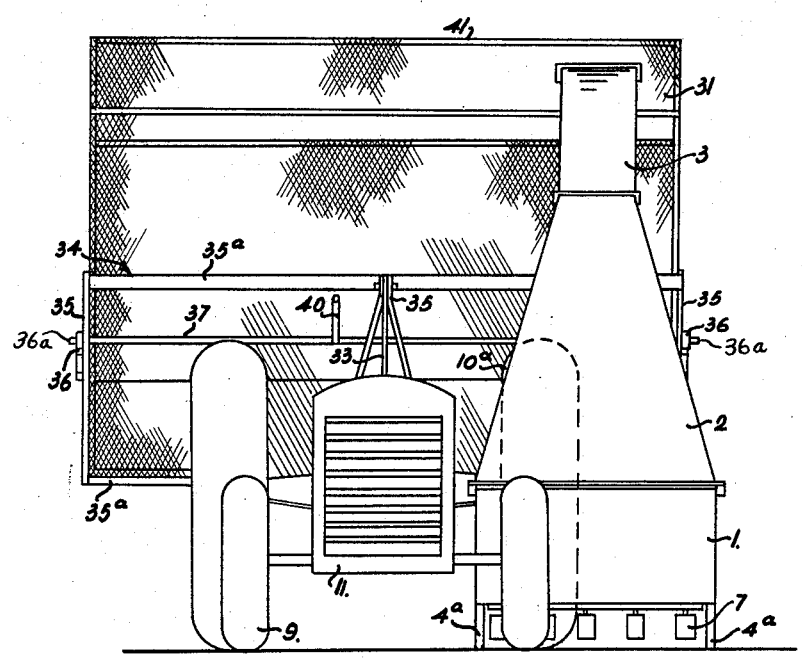
Figure 7:
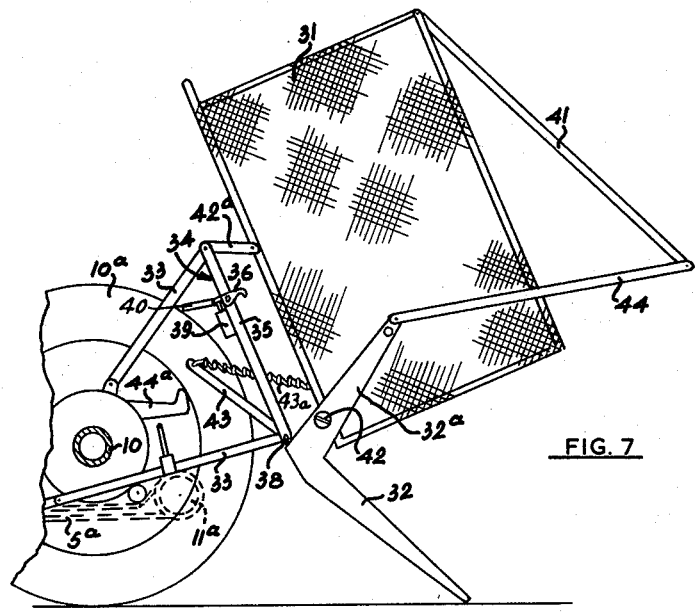
Figure 8:
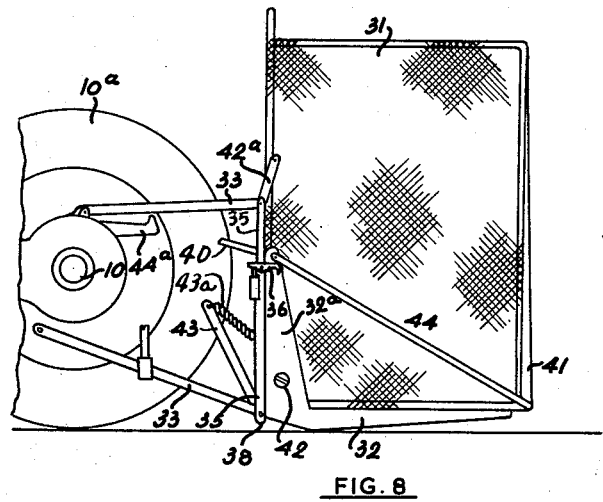
Figure 9:
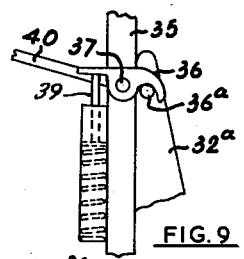
Figure 10:
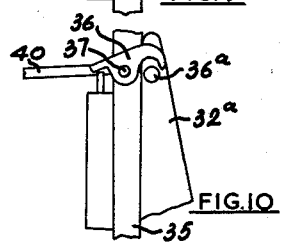
Figure 11:
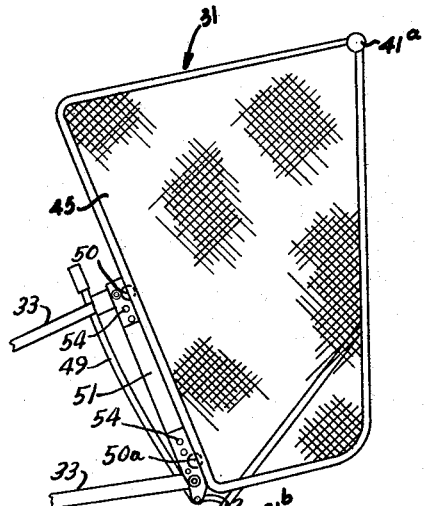
Figure 12:
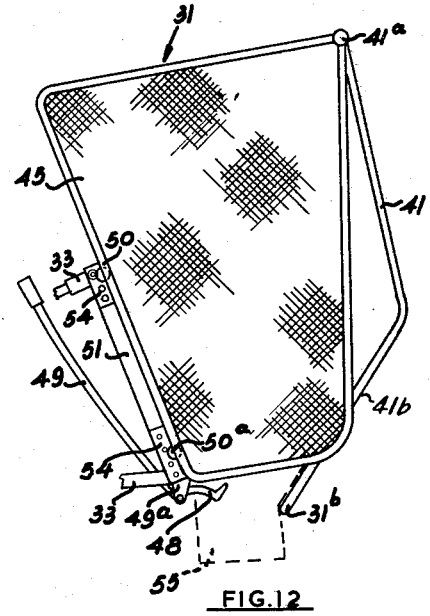
Figure 13:
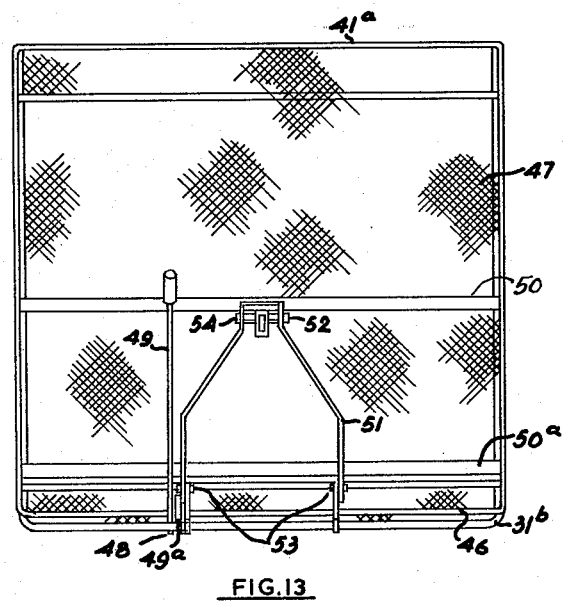

The invention will now be described with the aid of the accompanying drawings in which:

FIG. 1 is a view in side elevation of a tractor with one wheel removed and with the improved forage harvesting unit, mounted in position on the tractor, FIG. 2 is a view in front elevation of FIG. 1, FIG. 3 is a part plan view in detail and on a larger scale of the adjustable mounting means, FIG. 4 is a fragmentary sectional view on the line 4—4 of FIG. 3, FIG. 5 is a fragmentary sectional view in detail and on a larger scale on the line 5—5 of FIG. 3 illustrating the rotary cutting means lowered to ground level, FIG. 6 is a similar view to FIG. 5 showing the rotary cutting means raised from ground level, FIG. 7 is a view in side elevation of the container opened for the emptying of cut crop therefrom, FIG. 8 is a similar view to FIG. 7 showing the container lowered on the hydraulic linkage system and closed, FIGS. 9 and 10 are enlarged detailed views of an arrangement controlling the tipping and opening of the container, FIGS. 11 and 12 illustrate a modification of the container, FIG. 13 is a view in front elevation of FIG. 11.

In further describing the invention the housing 1 accommodating the rotary cutting means is of somewhat conventional shape and formation (see FIGURES 1 and 2) i.e. the housing 1 is shaped from sheet metal and is of cylindrical formation and is provided with a chute 2 open to the interior of the housing 1 and leading upwardly from the housing 1. As illustrated the chute 2 which is provided as a detachable component, decreases or tapers in size towards its outer or free end, while furthermore the outer end of the chute 2 is curved over in the form of a spout 3 (see FIG. 1). In a preferred form of the invention the curved spout end 3 of the chute 2 is provided as a separate turnable component capable of being turned on the chute 2 so that cut crop issuing therefrom can be directed in a selected direction.

The cylindrical housing 1 is closed by end plates 4 mounted on runners 4$^a$ while the bottom portion of the cylindrical wall of the housing 1 is open and the rotary cutting means (hereinafter referred to as the rotary cutter) generally indicated as at 5 (see FIG. 5), is accommodated within the housing 1. The rotary cutter 5 can be of any desired type for instance, as illustrated in FIGURE 5 the rotary cutter 5 includes a central spindle 6 mounted concentrically within the cylindrical housing 1, and from which a number of flail type cutters 7 are suspended. More specifically, four radial arms 8 extend from the spindle 6, the arms 8 extending for approximately the full length of the spindle 6, and a row of flail type cutters 7 are suspended from each arm 8 in staggered relationship.

Drivable connection of the rotary cutter 5 is provided by a chain drive 5$^a$ passed about a sprocket wheel 6$^a$ on the spindle 6 and about a sprocket wheel on the power take-off 11$^a$ of the tractor 11 as shown in FIG. 3.

The adjustable mounting means which will now be described provides for the adjustable mounting of the rotary cutter 5, housing 1, and chute 2, which will be referred to hereinafter as the mower assembly, from the side of the tractor 11 so that the rotary cutter housing 1 is suspended between a front wheel 9 and a rear wheel 10$^a$ of the tractor 11 with the spindle 6 of the rotary cutter 5 extending laterally from the tractor 11.

The adjustable mounting means includes a main support arm 13 which is secured to the rear axle 10 of the tractor 11 and extends forwardly therefrom along one side of the tractor 11. A laterally extending extension 13$^a$ extends outwardly at right angles from the free end of the main support arm 13 the extension 13$^a$ serving as the actual point of suspension of the mower assembly.

As illustrated in FIGS. 3 to 6, a bar 15 is adjustably accommodated between lugs 16 secured on the underside of the extension 13$^a$ by means of a bolt 16$^b$ extending through the lugs 16 and through a slot 15$^b$ in the bar 15 and a pair of chains 16$^a$ are attached to the bar 15 so that the chains 16$^a$ suspend from the bar 15. The lower ends of the chains 16$^a$ are attached to the outer ends of arms 17 secured to and extending from a shaft 18 rotatable in bearings 18$^a$ and mounted along the rear side of the cylindrical housing 1 immediately above the opening of the housing 1.

The actual raising and lowering of the rotary cutter 5, housing 1 and chute 2 is effected by means of a spring loaded hand lever 19 of somewhat bell-crank formation (see FIGS. 5 and 6). More specifically, the lower end 19a of the arm of the bell-crank lever 19 is fixed to shaft 18 towards the inner end of the shaft 18 and the arrangement is such that upon the lever 19 being pulled rearwardly aided by a spring 19a (see FIG. 6), the points of attachment between the lower ends of the chains 16a and the arms 17, act as the point of fulcrum, enabling the mower assembly to be raised upwardly in a pivoting action. A ratchet 20 is provided mounted in a suitable position on the tractor 11 in a selected notch of which the hand lever 19 can be locked to maintain the mower assembly in a raised position.

As shown in FIG. 4, the slidable engagement of the bar 15 between the lugs 16 enables the position of the mower assembly to be adjusted to, or away from the tractor 11, while further the assembly can be levelled by means of a set screw 15a passed through the extension arm 13a to bear on the inner end of the bar 15. By adjusting the position of set screw 15a through the extension arm 13a, the bar 15 can be levelled or tilted to correspondingly adjust the position of the mower assembly.

The mower assembly is braced from the main support arm 13 by a link (referred to herein after as a stabilizing link 21), pivotally attached between the extension arm 13a and the housing 1, while a bracing arm 22 is pivotally attached by one end to the housing 1 and by its opposite end to the underside of the axle 10. The bracing arm 22 besides serving to brace the mower assembly, also serves as a means of adjustment for the chain drive 5a drivably connected between the power take-off 11a of the tractor 11 and the spindle 6 of the rotary cutter 5. More specifically, the rear end of the bracing arm 22 is provided with an extension 23 adjustably secured to the bracing arm 22 by bolts 24 passed through slots 25 in the extension 23, and the extension 23 in turn is pivotally attached to the free end of a bell-crank lever 26 pivotally mounted on a bracket 27 attached at the main support arm 13 to the underside of the axle 10. By adjusting the position of the bolts 24 in the slots 25 the length of the bracing arm 22 can be lengthened or shortened to move the mower assembly towards or away from the main support arm 13, thus providing a first adjustment to the tension of the chain drive 5a. Final adjustment to the tension of the chain drive 5a is provided by means of the bell-crank lever 26 which when pivoted on its pivotal mounting, also moves the bracing arm 22 to move the mower assembly to or away from the main support arm 13, the bell-crank lever 26 being locked or set in position by means of a bolt 28 passed through the bell-crank lever 26 and through a slot 29 in the bracket 27.

As illustrated in FIGS. 1, 3, 5 and 6 the bracing arm 22 also serves as the anchoring point for the hand lever spring 19a which serves to aid in the lifting of the mower assembly. More particularly, one end of the spring 19a which is a coiled tension spring, is secured to the outer end of a lug 30 secured to the shaft 18, while the opposite end of the spring 19a is anchored to the bracing arm 22. The spring 19a is under tension and upon the hand lever 19 being pulled rearwardly to lift the mower assembly, the spring 19a assists in raising the mower assembly to its non-operating position.

The mower assembly as has been described is operated and powered from the tractor 11 and during forward movement of the tractor 11, the rotating flails 7 cut grass or other crop which is forced up the chute 2 assisted by the draught of air created by the rotating flails 7 and thrown from the open end of the spout 3 into a suitable container, trailer or the like.

In a preferred form of the invention however, a container for cut crop is provided, carried on the hydraulic linkage system of the tractor 11 thus providing a complete unit for cutting and gathering cut crop as one single unit controlled by the driver of the tractor. However, despite the desirability of providing one complete unit as mentioned, it will be readily apparent from the aforegoing description and the illustrations that the mower assembly can be used as an independent unit for the cutting of crop. Consequently it will be understood, that the invention is not limited to use of the mower assembly in combination with a container carried on the hydraulic linkage system of the tractor 11 as is now about to be described.

As illustrated in FIGS. 1, 2, 7 and 8 of the drawings the container, which is in the form of a wire cage 31 of box-like, rectangular proportions, is used in conjunction with a platform 32 which is pivotally mounted on the links 33 of the hydraulic linkage system of the tractor 11. The platform 32 used in this invention can be of the conventional type platform carried on the hydraulic linkage system of a tractor 11 for carrying purposes. More specifically, such a platform 32 is constructed with corner posts 32a secured to the side edges of the platform 32 adjacent the inner corners of the platform 32.

The platform 32 as has been described is pivotally connected to a sub-frame generally indicated as at 34, which in turn is pivotally and releasably attached to the hydraulic linkage system in a manner controlling opening of the cage 31 as will now be described. More particularly, the subframe 34 consists of a series of upright supports 35 joined by cross members 35a as shown in FIG. 2. The free end of the upper link 33 of the hydraulic linkage system is pivotally connected to the central and upper portion of the sub-frame 34, while the free ends of the two lower links 33 of the hydraulic linkage system, are pivotally connected to a cross shaft 38 carried at the lower and central portion of the subframe 34. The platform 32 which is approximately equal in width to the sub-frame 34, is hinged by its rear edge to the bottom edge of the sub-frame 34, while quick release type fasteners, lock the corner posts 32a to the side uprights 35 to the sub-frame 34.

As illustrated in FIGS. 9 and 10 of the drawings, a quick release type fastener is provided on each side upright 35 each fastener consisting of a catch lever 36 mounted on a rod 37 pivotally mounted and extending across the sub-frame 34 as shown in FIG. 2, each catch lever 36 being shaped with a recess which engages with a projection 36a on each corner post 32a of the platform 32. As shown in FIGS. 9 and 10 each catch lever 36 is maintained in engagement with its respective projection 36a, by a spring loaded plunger 39 bearing on the underside of the inner end of the catch lever 36 while release of the catch levers 36 from the projections 36a, to allow for tilting of the platform 32, is effected by lifting a hand lever 40 extending from the rod 37 as shown in FIG. 2 to turn the rod 37 and lift the catch levers 36 from engagement with the projections 36a.

The wire cage 31 consists of a tubular steel frame about which wire mesh is secured. More specifically, the wire cage 31 consists of two side walls, a front wall, and a rear wall 41 in the form of a hinged flap hinged by its upper corners between the upper and outer corners of the side walls. The cage 31 is carried on the platform 32 so that the platform 32 forms the hinged bottom of the cage 31. With the cage 31 in position on the platform 32, the inner corners of the cage 31 are located adjacent each corner post 32a and the side uprights 35 of the sub-frame 34 and a pivot bolt 42 passed through each corner post 32a, pivotally engages the cage 31 at each inner corner of the latter, a short distance upwardly from the bottom edge of the cage 31. The cage 31 is also connected to the upper end of the side upright 35, by short links 42a the length of each link 42a being approximately equal in length to the distance between the bottom edge of the cage 31 and the pivot bolts, 42. Side links 44 are pivotally connected between the upper end of each corner post 32ª and the outer and bottom corners of the hinged rear wall 41 of the cage 31.

In operation when the hydraulic linkage system is operated to raise the hydraulic links 33, the platform 32 and cage 31 are raised to a position as shown in FIGURE 1.

With the platform 32 and cage 31 in the raised position a hook 43, pivotally connected to the sub-frame 34 and connected by a spring 43ª to the cage 31, engages over a lug 44ª on the rear of the tractor 11 as shown in FIG. 1. The engagement of the hook 43 on the lug 44ª relieves the raised hydraulic system of the weight of the combined cage 31 and platform 32.

Upon the cage 31 being filled with cut crop and emptying of the cage 31 being desired, the tractor operator raises the hand lever 40 to pivot the rod 37 which in turn releases the catch levers 36 from the projections 36ª on the corner posts 32ª of the platform 32 causing the spring 43ª to disengage the hook 43 from the lug 44ª. As a result, the platform 32 is tilted downwardly on its hinged mounting until the free edge of the platform 32 strikes the ground to open the bottom of the cage 31. At the same time, due to the pivotal connection of the cage 31 to both the corner posts 32ª of the platform 32 and the side uprights 35 of the sub-frame 34, the cage 31 is carried outwardly from the sub-frame 34 (see FIG. 7).

As a result of the tilting movement of the platform 32 as has been described the side links 44 connected between the upper ends of the corner posts 32ª and the bottom edge of the rear wall 41, hinge the latter outwardly to open or partially open the rear wall 41 of the cage 31 in conjunction with the platform 32 for emptying purposes.

To re-close the cage, the hydraulic links 33 are lowered so that the platform 32 is seated on the ground closing the bottom of the cage 31 (see FIG. 8) enabling the catch levers 36 to re-engage on the projections 36ª and the rear hinged wall 41 to close. With the platform 32 so engaged the assembly of cage 31 and platform 32 can be lifted on the hydraulic links 33 to a raised position as already described allowing re-engagement of the hook 43 on the lug 44ª at the rear of the tractor.

FIGS. 11, 12, and 13 illustrate a modified form of cage 31 and apparatus for emptying the cage without the necessity of lowering the cage 31 on the hydraulic linkage system of the tractor 11. More specifically the cage 31 which is of frame and wire mesh construction is substantially V-shaped when viewed in side elevation with a downwardly and inwardly inclined rear wall 41 formed as a door and hinged along its upper edge 41ª on the cage 31. Under normal circumstances the cage 31 is supported on the hydraulic linkage system in a tilted position (see FIGS. 11 and 12) so that the hinged door 41, assuming a more or less perpendicular position, remains closed.

As illustrated the rear door 41 is shaped inwardly at an angle as at 41ᵇ between the side walls 45 of the cage 31 so that the cross strut 31ᵇ forming the lower edge of the door 41 closes onto, or lies adjacent the lower cross strut 46 of the front wall 47 of the cage 31.

The door 41 is maintained closed by a lever operated catch which engages over the cross strut 31ᵇ of the rear door 41. More particularly, a lever 49 is pivotally mounted on a bracket 49ª projecting downwardly from the cross strut 46 of the front wall 47 of the cage 31. As shown in the drawings the lever 49 extends upwardly and lies forwardly of the front wall 47 of the cage 31. The bottom section of the lever 49 lying beyond the pivotal mounting is bent rearwardly in the form of a concave hook 48 capable of engaging over the lower cross strut 31ᵇ of the door 41 to maintain the door 41 in a closed position.

The actual mounting of the cage 31 on the hydraulic linkage system of the tractor 11 is provided by two cross bars 50 and 50ª fixed across the front wall 47 of the cage 31 and to which a mounting bracket 51 is secured. More specifically the mounting bracket 51 is formed by two lengths of flat metal vertically positioned and inclined inwardly at their upper ends and between which pivot pins 52 and 53 are supported providing pivotal connection to the upper and lower hydraulic links 33 of the tractor.

As illustrated provision is made for adjustment of the pivot mounting 52 and 53 by means of a series of apertures 54 in selected ones of which the pivot pins 52 and 53 are positioned.

In operation to empty the cage 31 the lever 49 is pulled outwardly from the cage 31 so that the hook 48 releasing the lower cross strut 31ᵇ allows the door 41 to swing outwardly under the weight of the contents 55 of the cage 31, allowing the contents 55 (see FIG. 12) to fall through the now open bottom of the cage 31. Upon emptying of the cage 31 the door 41, freed from the weight of the contents 55, swings inwardly to engage once more on the hook 48.

In this latter direction and as illustrated in FIGS. 11 and 12 it is preferred that the door 41 when in its closed position, be at a slight angle short of the vertical so that when the door swings inwardly, the momentum of the inward swing of the door 41 plus the fact that the door 41 tends to swing to a vertical position, assures that the door 41 will engage on the hook 48.

It will be obvious to those skilled in the art that various changes may be made in the invention without departing from the spirit and scope thereof and therefore the invention is not limited by that which is shown in the drawings and described in the specification, but only as indicated in the appended claims.

What I do claim and desire to obtain by Letters Patent of the United States of America is:

1. A forage harvesting unit for mounting on one side of a tractor, said tractor having front and rear wheels, a rear axle and a power takeoff adjacent the rear axle, said unit comprising a main support arm, means on the rear end of said support arm for securing the same to said rear axle with said arm extending forwardly along one side of the tractor, a lateral outward extension on the forward end of said arm, a bar slidably and pivotally mounted on said extension for movement toward and away from said arm and for pivotal movement about an axis substantially parallel to the longitudinal axis of said arm and intermediate the length of said bar, flexible members depending from opposite ends of said bar, an elongated cutter housing open at the bottom, a cutter shaft rotatably mounted in said housing, cutters mounted on said shaft and operable through the open bottom of said housing, a discharge chute on the upper side of said housing, a support shaft rotatably mounted on the rear side of said housing, rearwardly extending spaced arms fixed to said support shaft, the lower ends of said flexible members being connected to the rear ends of said rearwardly extending arms, a hand lever fixed to said support shaft for turning the same to raise or lower said housing, flexible drive means extending rearwardly from said cutter shaft to said power takeoff and longitudinal brace means extending between said housing and said rear axle.

2. A forage harvesting unit as defined in claim 1, in which means is provided for adjusting and fixing the pivotal position of said bar.

3. A forage harvesting unit as defined in claim 1, in which said cutters are of the flail type and in which ground engaging shoes are provided on opposite ends of said housing.

4. A forage harvesting unit as defined in claim 1, in which ratchet means is provided for engaging said hand lever to releasably fix the same in adjusted position.

5. A forage harvesting unit as defined in claim 1, in which spring means is provided for partially counterbalancing the weight of said housing and associated parts.

6. A forage harvesting unit as defined in claim 1, in which said brace means includes a brace bar pivotally connected at the forward end to said housing and pivotally connected at the rear end to said rear axle and means to adjust the length of said brace bar.

7. A forage harvesting unit as defined in claim 6, in which a bell crank lever is pivotally mounted on said rear axle, the rear end of said brace bar being pivotally connected to said bell crank lever and means to releasably fix said bell crank lever in adjusted position whereby said housing may be moved forwardly or rearwardly by operation of said bell crank lever.

8. A forage harvesting unit for mounting on one side of a tractor, said tractor having front and rear wheels, a rear axle and a power takeoff adjacent the rear axle, said unit comprising a main support arm, means on the rear end of said support arm for securing the same to said rear axle with said arm extending forwardly along one side of the tractor, a lateral outward extension on the forward end of said arm, a bar pivotally mounted on said extension for pivotal movement about an axis substantially parallel to the longitudinal axis of said arm and intermediate the length of said bar, flexible members depending from opposite ends of said bar, an elongated cutter housing open at the bottom, a cutter shaft rotatably mounted in said housing, cutters mounted on said shaft and operable through the open bottom of said housing, a discharge chute on the upper side of said housing, a support shaft rotatably mounted on the rear side of said housing, rearwardly extending spaced arms fixed to said support shaft, the lower ends of said flexible members being connected to the rear ends of said rearwardly extending arms, a hand lever fixed to said support shaft for turning the same to raise or lower said housing, flexible drive means extending rearwardly from said cutter shaft to said power takeoff and longitudinal brace means extending between said housing and said rear axle.

9. A forage harvesting unit for mounting on one side of a tractor, said tractor having front and rear wheels, a rear axle and a power takeoff adjacent the rear axle, said unit comprising a main support arm, means on the rear end of said support arm for securing the same to said rear axle with said arm extending forwardly along one side of the tractor, a lateral outward extension on the forward end of said arm, a bar mounted on said extension, flexible members depending from opposite ends of said bar, an elongated cutter housing open at the bottom, a cutter shaft rotatably mounted in said housing, cutters mounted on said shaft and operable through the open bottom of said housing, a discharge chute on the upper side of said housing, a support shaft rotatably mounted on the rear side of said housing, rearwardly extending spaced arms fixed to said support shaft, the lower ends of said flexible members being connected to the rear ends of said rearwardly extending arms, a hand lever fixed to said support shaft for turning the same to raise or lower said housing, flexible drive means extending rearwardly from said cutter shaft to said power takeoff and longitudinal brace means extending between said housing and said rear axle.

10. A forage harvesting unit for mounting on one side of a tractor, said tractor having front and rear wheels, a rear axle and a power takeoff adjacent the rear axle, said unit comprising a main support arm, means on the rear end of said support arm for securing the same to said rear axle with said arm extending forwardly along one side of the tractor, a lateral outward extension on the forward end of said arm, a bar mounted on said extension, flexible members depending from opposite ends of said bar, an elongated cutter housing open at the bottom, a cutter shaft rotatably mounted in said housing, cutters mounted on said shaft and operable through the open bottom of said housing, a discharge chute on the upper side of said housing, a support shaft rotatably mounted on the rear side of said housing, rearwardly extending spaced arms fixed to said support shaft, the lower ends of said flexible members being connected to the rear ends of said rearwardly extending arms, means for turning said support shaft to raise or lower said housing, flexible drive means extending rearwardly from said cutter shaft to said power takeoff and longitudinal brace means extending between said housing and said rear axle.

References Cited in the file of this patent

UNITED STATES PATENTS

| | | |
|---|---|---|
| 1,985,373 | Johnston | Dec. 25, 1934 |
| 2,576,886 | McCoy | Nov. 27, 1951 |
| 2,597,692 | Wills et al. | May 20, 1952 |
| 2,656,662 | Hines | Oct. 27, 1953 |
| 2,738,635 | Gray | Mar. 20, 1956 |
| 2,836,022 | Caldwell | May 27, 1958 |
| 2,974,468 | Lundell | Mar. 14, 1961 |

FOREIGN PATENTS

| | | |
|---|---|---|
| 1,131,837 | France | Oct. 22, 1956 |
| 862,387 | Great Britain | Mar. 8, 1961 |